Feb. 21, 1967  S. M. NEELY  3,305,678
FLOODLIGHTING OF ATHLETIC FIELDS
Filed Sept. 29, 1961  2 Sheets-Sheet 1

INVENTOR.
SAMUEL M. NEELY
BY
ATTORNEY

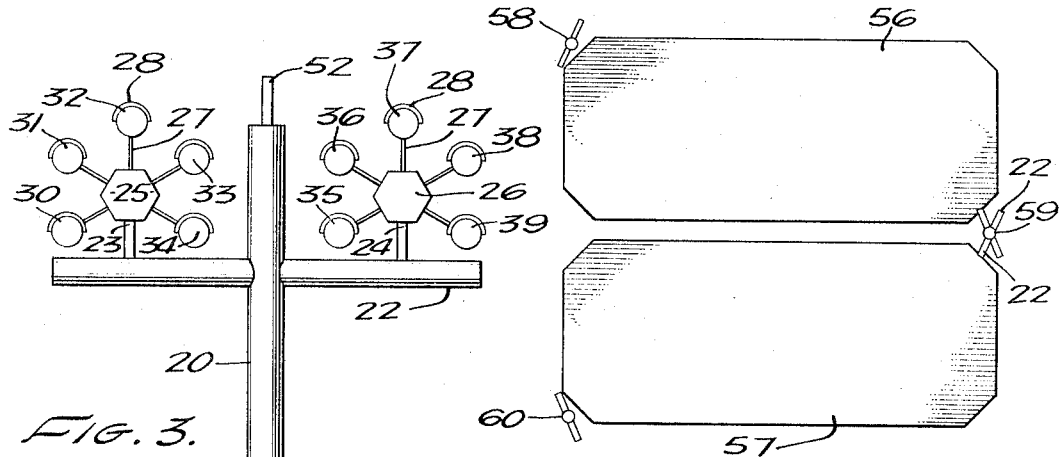
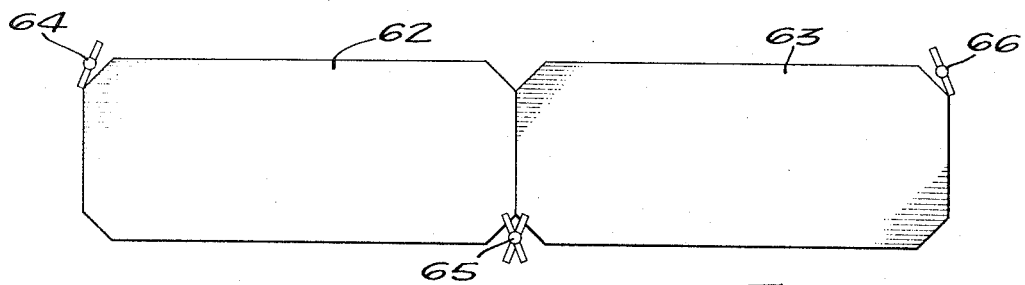
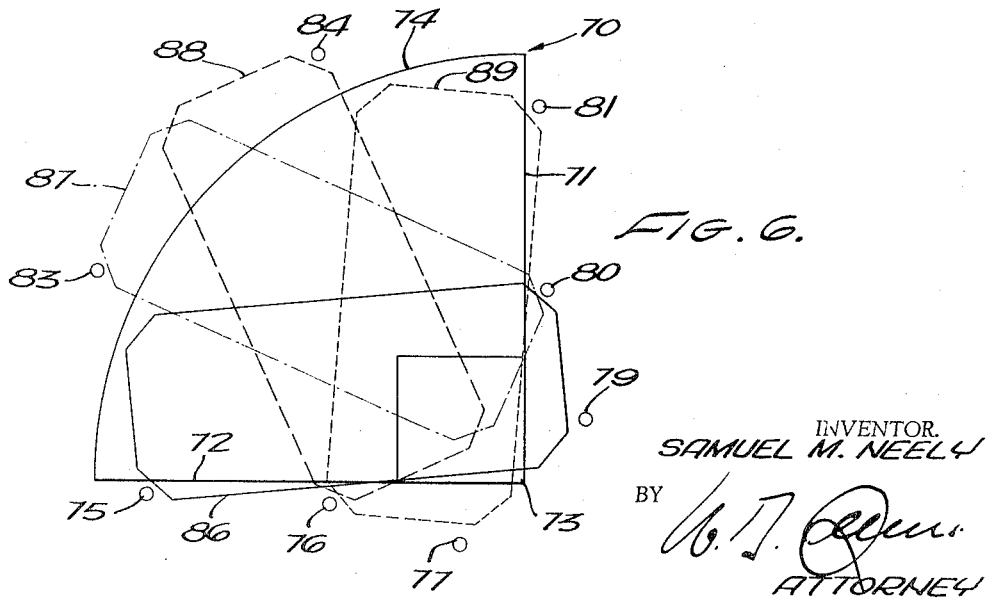

United States Patent Office 3,305,678
Patented Feb. 21, 1967

3,305,678
FLOODLIGHTING OF ATHLETIC FIELDS
Samuel M. Neely, 511 N. Mayo, Compton, Calif. 90221
Filed Sept. 29, 1961, Ser. No. 141,753
6 Claims. (Cl. 240—3)

This invention relates generally to illumination of athletic fields and particularly to floodlighting of ice hockey rinks.

It is an object of this invention to provide an arrangement of floodlights for illuminating a hockey rink with concordance of sufficient illumination and minimum of floodlighting equipment.

Viewed in its broader aspects, the invention provides an arrangement in which two poles for mounting respective banks of floodlamps are located at diagonally opposite corners of the hockey rink. For optimum conditions of substantially uniform light intensity throughout the rink and minimum number of lamps, the lamps are directed toward respective spots on the playing field in a pattern in which concentration of spots is increased as the distances of the lamps from their respective spots increase. Also, the beams of light from one bank which are directed toward the center zone of the rink are crossed by corresponding beams from the other bank for illuminating the space above the playing field.

Another object of the invention is to provide an arrangement for optimum lighting of a plurality of adjacent hockey rinks commensurate with economy of lighting equipment.

The invention is furthermore suited for adaptation to illumination of an athletic field, e.g., softball field, used primarily in the summer months, and then converted for use in the winter months as a hockey rink, with the hockey rink being so oriented with respect to the lighting equipment for the softball field that rearrangement of the lighting equipment is unnecessary in making the conversion.

Further objects and advantages of the invention will appear during the course of the following part of this specification, wherein the details of particular lighting arrangements are described with reference to the accompanying drawing, in which:

FIGURE 3 is a view in elevation of a bank of floodlamps of this invention;

FIGURE 4 is a plan view of two hockey rinks arranged side by side and equipped with floodlighting according to this invention;

FIGURE 5 is a plan view of two hockey rinks arranged end to end and equipped with a flood lighting arrangement of this invention;

FIGURE 6 is a schematic plan view of a standard softball field with an installation for floodlighting the field, and illustrating several ways in which the field may be converted to use as a hockey rink without relocation of the lighting equipment.

Figure 1:
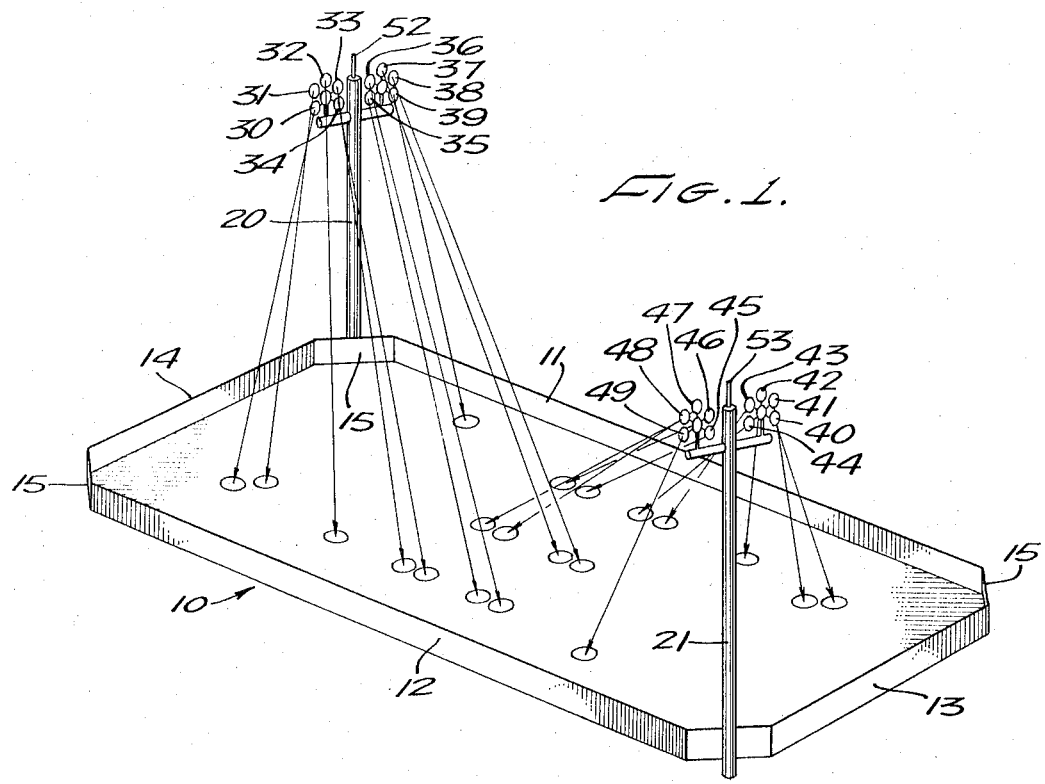
FIGURE 1 is a perspective view of a standard hockey rink equipped with floodlamps according to this invention.
Figure 2:
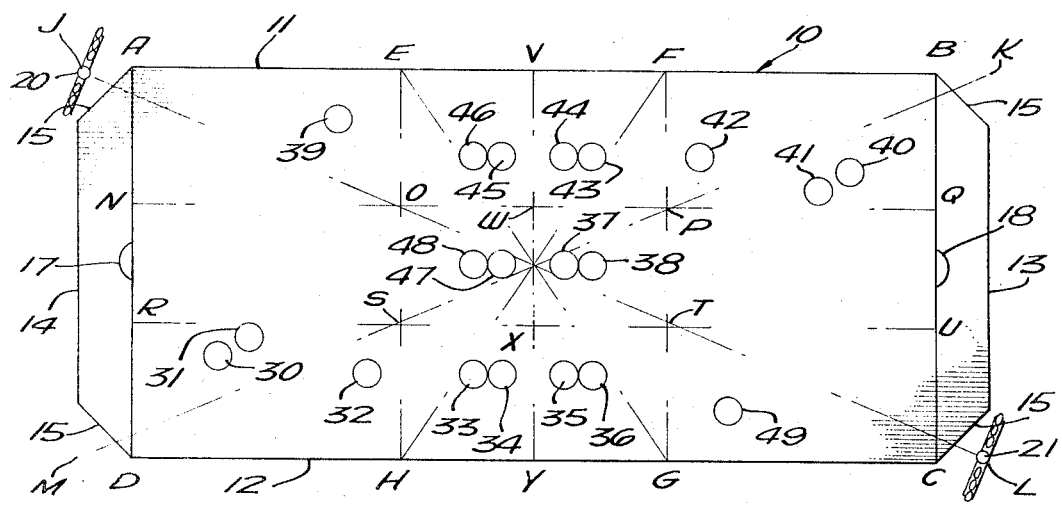
FIGURE 2 is a plan view of the hockey rink.

Referring to the drawings in detail, and in particular to FIGURES 1 and 2, there is shown a standard rink for ice hockey designated generally by reference numeral 10, the rink being enclosed by a wooden barrier, the side boards of which are designated by numerals 11 and 12 respectively, and the endboards by numerals 13 and 14 respectively. The dimensions of a standard hockey rink are approximately 200 feet long and 85 feet wide. At the corners of the rink, the enclosing barrier may be angled in puck-deflecting corner sections 15.

In FIGURE 2, the rink is shown as being marked off with goal lines AD and BC respectively and defending lines EH and FG respectively. The distance between the goal lines of a standard rink is 180 feet. The defending lines trisect the area between the goal lines AD and BC to define three rectangular zones, i.e., a center zone EFGH and two defending-attacking zones, AEHD and FBCG. Zone AEHD is a defending zone for the playing team defending the goal-net 17 and is the attacking zone for the playing team defending the opposite goal 18, the zone FBCG likewise being a defending or attacking zone depending on the direction of play of the respective teams.

The floodlighting equipment for the rink 10 comprises two poles 20 and 21 located at its diagonally opposite corners. Inasmuch as the corner boards 15 of the enclosing barrier intercept the lines of the side and end boards short of their respective points of convergence, the points A, B, C, and D are not extreme corner points of the rink, and accordingly, the letters J, K, L, and M are employed to designate the corner points respectively of convergence of projections of the lines of the side and end boards. Pole 20 is located at corner point J and pole 21 at the diagonally opposite corner point L. Corner points J and L may be referred to as pole corners and the corner points K and M as non-pole corners. Corner point K being proximate corner L, is sometimes hereinafter referred to as an adjacent or nearer corner with respect to corner L, while the corner point M is correspondingly sometimes referred to as the adjacent or nearer corner with respect to pole corner J.

The poles 20 and 21 mount banks of floodlamps and are preferably identical to each other. FIGURE 3 of the drawing showing details of the arrangement of lamps for pole 20. Pole 20 includes a crossbar 22 having uprights 23 and 24 on the upper ends of which are hubs 25 and 26 respectively. Extending radially from each hub are five arms 27 on the outer ends of which are gimbals 28 for mounting lamps 30 to 34, respectively, for hub 25, and lamps 35 to 39 respectively for hub 26. The ten lamps on pole 21 are consecutively numbered 40 to 49.

In FIGURES 1 and 2, there are twenty spots on the playing field and these represent the respective points toward which lamps 30 to 49 inclusive are directed. The lamps are preferably of conventional sealed beam type for producing diffused light patterns as compared with lamps of compact beams; however, for purposes of convenience in describing preferred patterns of beam orientation according to this invention, the respective beams of light will be considered herein as being directed toward definite spots on the playing field. The spots are designated by numerals corresponding to those employed to designate their respective lamps, e.g., spot 30, which is nearest the left hand corner of the rink in FIGURE 1, bears the same reference numeral as that used to designate that lamp on pole 20 which is directed toward spot 30.

The spots are more concentrated in the center zone of the playing field than in the defending-attacking zones. The playing field is trisected longitudinally by two imaginary lines NQ and RU and these cross the defending lines EH and FG at points O and P respectively for line NQ, and at points S and T respectively for line RU, thus, to define a grid of nine equal rectangular sections. The center zone of the playing field is divided by an imaginary diagonal FH into two triangles EFH and FGH, the triangle EFH being remote from pole 21 and the triangle FGH being remote from pole 20. For purposes of convenience in distinguishing the diagonal FH from the other diagonal EG of the center zone in descriptive terms, the diagonal FH is referred to herein as being that one of the diagonals of the center zone which is at a greater angle from diagonal JL of the rink.

Of the ten lamps on pole 20, six of them, 33 to 37 inclusive, are directed toward respective spots dispersed in that triangle FGH of the center zone, which is remote from the pole 20; three lamps, 30, 31 and 32, are directed toward respective spots dispersed in the corner section RSHD adjacent or proximate the nearer nonpole corner M of the rink; and the lamp, number 39, is directed toward a spot in rectangular section AEON proximate pole 20. In a like pattern, six of the lamps on pole 21 are directed toward respective spots dispersed in its remote triangle of the center zone, three toward respective spots in that corner section, FBQP, which is proximate the poles nearer nonpole corner K, and one toward a spot in that rectangular corner section, TUCG, which is proximate the pole 21. In this pattern, the beams of light from pole 21 which are directed toward the center zone of the rink cross corresponding beams from the pole 20. Such crossing of beams of light provides light diffusion for illuminating a substantial space above grade level of the rink. Because of the light dispersion characteristics of modern flood lamps, it is not necessary to direct any lamp toward the midsections NOSR and PQUT of the defending-attacking zones.

Another way of describing the dispersion pattern of the illustrated arrangement of spots for lamp direction for the center zone is with reference to a bisector VY of the center zone which crosses the longitudinal trisecting lines NQ and RU of the rink at points W and X respectively to divide the center zone into six equal rectangular areas, two lamps (48 and 47) of pole 21 being directed toward rectnagular area OWXS, two toward area EVWO, and two toward area VFPW, and for the pole 20, three pairs of lamps being directed toward the remaining of such center zone rectangular areas respectively.

An acceptable standard of illumination for hockey rinks is a minimum of 10 foot candles anywhere on the playing surface or grade level of the rink. This minimum is fully met by an installation of this invention having twenty lamps, each of 1500 watts and with the lamps being positioned about 55 feet above grade level. Actually, the intensity of illumination in this case is slightly better than the prescribed minimum of 10 foot candles. In contrast to this case is that of conventional installations employing eight poles with four poles along each side of the rink. An installation according to this invention will cost only one-third of that for such conventional installation.

Should it be desired to use lamps of 1000 watts each, making a total of 30 such 1000 watt lamps, an additional battery of five lamps may be mounted atop the poles on end uprights 52 and 53, respectively, for these poles.

Referring to FIGURE 4, two ice hockey rinks 56 and 57 are illustrated in side-by-side relationship with an arrangement of three poles 58, 59 and 60 employed for mounting banks of lamps for illumination of the two rinks. One pole 59 is located at one pair of adjacent corners of the rinks 56 and 57 and carries two crossbars 22 for the respective rinks. One pole 58 is located at a corner of rink 56 diagonally opposite the pole 59, and the other pole 60 is located at that corner of rink 57 which is diagonally opposite pole 59.

In FIGURE 5 there are two rinks 62 and 63 arranged in end to end relationship, and the floodlighting equipment therefor, in accordance with this invention, employs again but three poles 64, 65 and 66, with pole 65 being located at one pair of adjacent end corners of the rinks and the other poles 64 and 66 at diagonally opposite corners of the rinks respectively.

In FIGURE 6 that facet of the invention is illustrated according to which floodlighting equipment for a standard softball field may be utilized without relocation of poles for using the field during winter months for ice hockey purposes. The softball field is designated by reference numeral 70, its first base and third base foul lines by numerals 71 and 72 respectively; its homeplate by numeral 73, and its outfield fence by numeral 74. For adequate illumination with poles, including banks of lamps as described for pole 20 and its bank of lamps, a most economical pattern for arrangement of poles is that shown in FIGURE 6 having three poles 75, 76 and 77 spaced apart along the third base foul line, three poles 79, 80 and 81 along the first base foul line, and two poles 83 and 84 beyond the outfield fence 74. If the softball field is divided in two halves by passing a line through homeplate and through and beyond second base, then poles 83 and 84 will lie approximately along a bisector line through homeplate and these respective halves of the softball field as will be evident from FIGURE 6. Poles 77 and 79 are along perpendicular bisectors of third base and first base lines respectively, and poles 75 and 81 are adjacent left and right outfield corners respectively.

There are several ways in which a standard hockey rink may be oriented with respect to a softball field to utilize the floodlighting installation of the softball field so as to secure the adavntages afforded by this invention. One position is that shown by the solid line 86 outlining a hockey rink which employs lighting poles 75 and 80 of the softball field at diagonally opposite corners of the hockey rink. Another position is that represented by the dot and dash outline 87 utilizing poles 80 and 83 at its diagonally opposite corners. A third alternate position is that represented by the dash-line outline 88 which utilizes lighting poles 84 and 76 at its opposite corners, and a fourth position of orientation is that represented by the dotted line rink 89 utilizing poles 81 and 76.

While the particular floodlighting of athletic fields herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An arrangement of floodlights for two hockey rinks disposed with an edge of one in closely-spaced parallel relation to an edge of the other consisting of three poles, each pole having a plurality of flood lamps at its top, one pole being upright at a position adjacent one pair of adjacent corners of the two rinks, the other two poles being located adjacent respective rink corners diagonally opposite said one pole, and the lamps being directed toward respective spots on the playing surfaces of the rinks in a pattern of substantially uniform light intensity throughout said playing surfaces.

2. An arrangement of floodlights for illuminating two hockey rinks disposed in edge to edge parallel relationship consisting of three poles, each pole having a plurality of flood lamps at its top, one pole being upright at a position adjacent one pair of adjacent corners of the rinks, the other two poles being located adjacent respective rink corners which are diagonally opposite said one pole, and the lamps being directed toward respective spots on the playing surfaces of the rinks in a pattern of substantially uniform light intensity throughout said playing surfaces.

3. A mehtod of floodlighting a hockey rink consisting of the steps of erecting two poles at diagonally opposite corners respectively of the rink, mounting a plurality of flood lamps on each pole with the number of lamps on one pole being equal to that of the other, trisecting the two defending-attacking zones of the rink longitudinally of the rink to define two corner sections and a midsection for each of said zones, dividing the center zone of the rink along that one of its two diagonals which is at a greater angle from the diagonal between said pole corners thereby to define two triangles, and directing the lamps of each pole as follows; about six-tenths of the lamps toward that one of said two triangles which is remote from the pole, about three-tenths of the lamps toward that one of said corner sections which is proximate the said nearer corner of the pole, and about one-tenth of the lamps toward that of said corner sections which is proximate the pole.

4. An arrangement of floodlights for a hockey rink consisting of two upright poles respectively located at diagonally opposite corners of the rink, a plurality of sets of flood lamps on each pole, the two defending attacking zones of the rink being imaginarily trisected longitudinally of the rink to define two corner sections and a midsection for each of said zones, the center zone of the rink being imaginarily divided along that one of its two diagonals which is at a greater angle from the diagonal between said pole corners thereby to define two triangles, the lamps of each pole being directed as follows: about six-tenths of the lamps toward that one of said two triangles which is remote from the pole, about three-tenths of the lamps toward that one of said corner sections which is proximate the said nearer non-pole corner of the rink and about one-tenth of the lamps toward that of said corner sections which is proximate the pole.

5. An arrangement of floodlights for an athletic field useable selectively as a softball field and as a hockey rink and comprising eight upright poles, each pole having a plurality of flood lamps at its top, two groups of three poles each being spaced outside and along the first base and third base foul lines respectively of the field with the middle pole of each opposite a respective one of the first and third bases of said softball field and the seventh and eighth poles being spaced outside the outfield line of the field and along the bisectors of the two halves of the softball field formed by a line passing through second base and homeplate, whereby a hockey rink may be located selectively with its opposed diagonal corners adjacent said seventh pole and the pole adjacent third base and alternatively with its opposed diagonal corners adjacent said eighth pole and the pole adjacent first base, and whereby either pair of said last mentioned poles and the lights thereon may be employed to illuminate the associated one of said hockey rinks.

6. An arrangement of floodlights as defined in claim 5 characterized in that said hockey rink is selectively locatable generally along either foul line with the outermost one of said first base foul line group of lights being useable in combination with said third base pole lights to illuminate the rink in one of said locations and the outermost one of said third base foul line group of lights being useable in combination with said first base pole lights to illuminate the rink in the other of said locations.

References Cited by the Examiner

UNITED STATES PATENTS

| 1,235,527 | 7/1917 | Cahill | 240—3 |
| 2,899,540 | 8/1959 | Allmand et al. | 240—3 X |

FOREIGN PATENTS 631,319   9/1927   France.

OTHER REFERENCES

"Softball Field Lighting" pamphlet published by Westinghouse Electric and Manufacturing Company, 1936, page 2 relied on.

NORTON ANSHER, *Primary Examiner.*

LAWRENCE CHARLES, *Examiner.*

EMIL G. ANDERSON, G. P. CHANDLER,
*Assistant Examiners.*